United States Patent
DeVaul et al.

(10) Patent No.: US 9,033,274 B2
(45) Date of Patent: May 19, 2015

(54) BALLOON ALTITUDE CONTROL USING DENSITY ADJUSTMENT AND/OR VOLUME ADJUSTMENT

(75) Inventors: Richard Wayne DeVaul, Mountain View, CA (US); Eric Teller, San Francisco, CA (US); Clifford L. Biffle, Berkeley, CA (US); Josh Weaver, San Jose, CA (US)

(73) Assignee: Google Inc., Mountain View, CA (US)

( * ) Notice: Subject to any disclaimer, the term of this patent is extended or adjusted under 35 U.S.C. 154(b) by 497 days.

(21) Appl. No.: 13/546,806

(22) Filed: Jul. 11, 2012

(65) Prior Publication Data

US 2014/0014769 A1    Jan. 16, 2014

(51) Int. Cl.
*B64B 1/62* (2006.01)
*B64B 1/56* (2006.01)
*B64B 1/40* (2006.01)

(52) U.S. Cl.
CPC ... *B64B 1/62* (2013.01); *B64B 1/56* (2013.01); *B64B 1/40* (2013.01)

(58) Field of Classification Search
CPC .............. B64B 1/62; B64B 1/60; B64B 1/58; B64B 1/56; B64B 1/44
USPC .............................. 244/99, 98, 97, 96, 31–33
See application file for complete search history.

(56) References Cited

U.S. PATENT DOCUMENTS

| | | |
|---|---|---|
| 1,390,745 A | 9/1921 | Armstrong |
| 2,790,479 A | 4/1957 | Mastenbrook |
| 2,931,597 A | 4/1960 | Moore, Jr. |
| 3,119,578 A | 1/1964 | Borgeson et al. |
| 3,337,162 A | 8/1967 | Bauserman |
| 3,390,853 A | 7/1968 | Wykes |
| 3,452,949 A | 7/1969 | Maloney et al. |
| 3,565,368 A * | 2/1971 | Byron .............................. 244/31 |
| 3,614,031 A | 10/1971 | Demboski |
| 3,807,384 A | 4/1974 | Schach et al. |
| 4,113,206 A | 9/1978 | Wheeler |

(Continued)

FOREIGN PATENT DOCUMENTS

| | | |
|---|---|---|
| WO | 2011/160172 | 12/2011 |
| WO | 2012/025769 | 3/2012 |

OTHER PUBLICATIONS

International Search Report and Written Opinion for International Application No. PCT/US2013/020525, mailed Apr. 22, 2013, 16 pages.

(Continued)

*Primary Examiner* — Tien Dinh
*Assistant Examiner* — Richard R Green
(74) *Attorney, Agent, or Firm* — McDonnell Boehnen Hulbert & Berghoff LLP.

(57) ABSTRACT

A balloon having an envelope and a payload positioned beneath the envelope. The envelope comprises a first portion and a second portion, wherein the first portion allows more solar energy to be transferred to gas within the envelope than the second portion. The balloon may operate in a first mode in which altitudinal movement of the balloon is caused, at least in part, by rotating the envelope to change an amount of the first portion that faces the sun and an amount of the second portion that faces the sun, and wherein the control system is further configured to cause the balloon to operate in a second mode in which altitudinal movement of the balloon is caused, at least in part, by moving a lifting gas or air into or out of the envelope.

25 Claims, 9 Drawing Sheets

(56) References Cited

U.S. PATENT DOCUMENTS

| | | | |
|---|---|---|---|
| 4,174,082 | A | 11/1979 | Eshoo |
| 4,215,834 | A | 8/1980 | Dunlap |
| 4,262,864 | A | 4/1981 | Eshoo |
| 4,366,936 | A | 1/1983 | Ferguson |
| 4,651,956 | A | 3/1987 | Winker et al. |
| 5,645,248 | A | 7/1997 | Campbell |
| 6,119,979 | A | 9/2000 | Lee et al. |
| 6,324,398 | B1 | 11/2001 | Lanzerotti et al. |
| 6,540,178 | B1 | 4/2003 | Hillsdon |
| 6,628,941 | B2 | 9/2003 | Knoblach et al. |
| 6,830,222 | B1 | 12/2004 | Nock et al. |
| 7,046,934 | B2 | 5/2006 | Badesha et al. |
| 7,156,342 | B2 * | 1/2007 | Heaven et al. .......... 244/30 |
| 7,356,390 | B2 | 4/2008 | Knoblach et al. |
| 7,469,857 | B2 | 12/2008 | Voss |
| 7,567,779 | B2 | 7/2009 | Seligsohn et al. |
| 7,568,656 | B2 | 8/2009 | Handley |
| 7,913,948 | B2 | 3/2011 | Porter |
| 7,948,426 | B2 | 5/2011 | Pevler et al. |
| 8,061,648 | B2 | 11/2011 | Lachenmeier |
| 2004/0065773 | A1 | 4/2004 | Morales |
| 2006/0000945 | A1 | 1/2006 | Voss |
| 2008/0272233 | A1 | 11/2008 | Marlin |
| 2009/0294576 | A1 | 12/2009 | LaForge |
| 2010/0039984 | A1 | 2/2010 | Brownrigg |

OTHER PUBLICATIONS

International Search Report and Written Opinion for International Application No. PCT/US2013/047241, mailed Sep. 6, 2013, 14 pages.

Joachim Horwath et al., "Broadband Backhaul Communication for Stratospheric Platforms: The Stratospheric Optical Payload Experiment (STROPEX)," Society of Photo-Optical Instrumentation Engineers (SPIE), 2006, vol. 6304 (12 pages).

Dirk Giggenbach et al., "Optical Free-Space Communications Downlinks from Stratospheric Platforms—Overview on STROPEX, the Optical Communications Experiment of CAPANINA," 14th IST Mobile & Wireless Communications Summit, Jun. 2005, No. 483, Dresden, Germany (4 pages).

Anthony S. Acampora et al., "A Broadband Wireless Access Network Based on Mesh-Connected Free-Space Optical Links," IEEE Personal Communications, Oct. 1999, 1070-9916/99, pp. 62-65.

J. Thornton et al., "Broadband communications from a high-altitude platform: the European HeliNet programme," Electronics & Communication Engineering Journal, Jun. 2001, pp. 138-144.

Jayasri Akella et al., "Building Blocks for Mobile Free-Space-Optical Networks," IEEE, 2005, 0-7803-9019-9/05 (5 pages).

D. Grace et al., "CAPANINA—Communications from Aerial Platform Networks Delivering Broadband Information for All," 14th IST Mobile & Wireless Communications Summit, Jun. 2005, No. 252, Dresden, Germany (5 pages).

Mihael Mohorcic et al., "Evaluation of Wavelength Requirements for Stratospheric Optical Transport Networks," Journal of Communications, Sep. 2009, vol. 4, No. 8, pp. 588-596.

Carolina Fortuna et al., "HAP based optical transport network design," Proceedings of the 15th International Electrotechnical and Computer Science Conference (ERK) Sep. 2006 (4 pages).

Alejandro Aragon-Zavala et al., High-Altitude Platforms for Wireless Communications, John Wiley & Sons, Ltd., 2008, pp. C1-80.

Alejandro Aragon-Zavala et al., High-Altitude Platforms for Wireless Communications, John Wiley & Sons, Ltd., 2008, pp. 81-158.

Alejandro Aragon-Zavala et al., High-Altitude Platforms for Wireless Communications, John Wiley & Sons, Ltd., 2008, pp. 159-241.

A. Biswas et al., "Deep Space Optical Communications Link Availability and Data Volume," Free-Space Laser Communication Technologies XVI, San Jose, CA, Jan. 2004 (9 pages).

D. Giggenbach et al., "Optical Data Downlinks from Earth Observation Platforms," Proceedings of the SPIE, 2009, vol. 7199 (14 pages).

David Grace et al., "Integrating Users into the Wider Broadband Network via High Altitude Platforms," IEEE Wireless Communications, 1536-1286/05, Oct. 2005, pp. 98-105.

Jayasri Akella et al., "Multi-channel Communication in Free-Space Optical Networks for the Last-mile," available online at: http://networks.ecse.rpi.edu/~sri/papers/Array-lanman07.pdf (last visited Jan. 18, 2012).

Alan E. Willner et al., "Physical Layer Routing in Free-Space Optical Networks, LEOS," available online at: http://photonicssociety.org/newsletters/oct05/physical_layer.html (last visited Jan. 18, 2012).

Justin Mullins, "NASA Develops 'Smart' Weather Balloons for Launch Sites," NewScientist, May 23, 2007.

James Hutchinson, Mobile Mesh Network Finds Interest in NGOs, Australian Red Cross enthusiastic about options presented by mesh telephony, available online at: http://www.computerworld.com.au/article/374682 l/mobile_mesh_network_finds_interest_ngos/ (last visited Jan. 17, 2012).

Dung Dinh Luong, et al., Network Architecture and Protocols, CAPANINA, Oct. 16, 2006, pp. 1-83.

Dung Dinh Luong, et al., Network Architecture and Protocols, CAPANINA, Oct. 16, 2006, pp. 84-172.

In Keun Son, Design and Optimization of Free Space Optical Networks, Auburn University, Dec. 13, 2010, pp. 1-78, Auburn, Alabama.

In Keun Son, Design and Optimization of Free Space Optical Networks, Auburn University, Dec. 13, 2010, pp. 79-147, Auburn, Alabama.

Hui Zang, et al., A Review of Routing and Wavelength Assignment Approaches for Wavelength-Routed Optical WDM Networks, Optical Networks Magazine, Jan. 2000, pp. 47-60.

Scott Bloom, et al., "The Last-Mile Solution: Hybrid FSO Radio," AirFiber, Inc., May 2002, pp. 1-20.

Di Wang, et al., "Throughput Capacity of Hybrid Radio-Frequency and Free-Space-Optical (RF/FSO) Multi-Hop Networks," Department of Electrical, Computer and Systems Engineering, Rensselaer Polytechnic Institute, pp. 1-8.

Mohammed N. Smadi, et al., "Free-Space Optical Gateway Placement in Hybrid Wireless Mesh Networks," Journal of Lightwave Technology, Jul. 15, 2009, vol. 27, No. 14, pp. 2688-2697.

Roy Eddleston, et al., Mesh Networking Soars to New Heights, available online at: http://www.airballooningevent.com/mesh-networking-soars-to-new-heights (last visited Jan. 18, 2012) (Feb. 19, 2005).

Barry William Walsh, Balloon Network Test Successful, available online at: http://17.taylor.edu/community/news/news_detail.shtml?inode=14221 (last visited Jan. 18, 2012) Nov. 5, 2007.

T.C. Tozer et al., High-altitude platforms for wireless communications, Electronics & Communication Engineering Journal, Jun. 2001, 127-137.

G. Ellinas, et al., Network Control and Management Challenges in Opaque Networks Utilizing Transparent Optical Switches, available online at: http://www.jaywalkertc.com/publications/JAW_live_papers/IEEE_Opt_Comm.pdf (last visited Jan. 18, 2012), pp. 1-19.

Asuman E. Ozdaglar, et al., Routing and Wavelength Assignment in Optical Networks, available online at: http://web.mit.edu/asuman/www/documents/RWA_Paper.pdf (last visited Jan. 18, 2012), pp. 1-25.

David Grace et al., Broadband Communications via High Altitude Platforms, John Wiley & Sons, Ltd., 2011, pp. 49-73.

David Grace et al., Broadband Communications via High Altitude Platforms, John Wiley & Sons, Ltd., 2011, pp. 75-113.

David Grace et al., Broadband Communications via High Altitude Platforms, John Wiley & Sons, Ltd., 2011, pp. 219-238.

Balaram et al., "Autonomous Mobility, Navigation and Control for Venus Aerobots," International Symposium on Artificial Intelligence, Optics and Automation in Space, Jul. 14, 1997, Tokyo, Japan, pp. 1-7.

Andrew S. Carten Jr., An Investigation of the Applicability of High Altitude, Lighter-Than-Air (LTA) Vehicles to the Tactical Communications Relay Problem, Air Force Cambridge Research Labs, Hanscom Air Force Base, Aug. 20, 1974, Massachusetts, pp. 1-62.

Michael Corbett et al., High Altitude Balloon Project, Wright State University, Engineering Design, Mar. 11, 2006, Dayton, Ohio, pp. 1-76.

* cited by examiner

BALLOON ALTITUDE CONTROL USING DENSITY ADJUSTMENT AND/OR VOLUME ADJUSTMENT

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon is provided. The balloon includes: (a) an envelope, (b) a payload positioned beneath the envelope, wherein the envelope comprises a first portion and a second portion, wherein the first portion allows more solar energy to be transferred to the gas within the envelope than and the second portion, and (c) a control system that is configured to cause the balloon to operate using a first mode in which altitudinal movement of the balloon is caused, at least in part, by rotating the envelope to change an amount of the first portion that faces the sun and an amount of the second portion that faces the sun, wherein the control system is further configured to cause the balloon to operate in a second mode in which altitudinal movement of the balloon is caused, at least in part, by moving a lifting gas or air into or out of the envelope. The envelope may be is non-symmetrical in shape such that the first portion has a surface area that is greater than a surface area of the second portion, wherein more solar energy is transferred to gas within the envelope when the first portion of the balloon is facing the sun than when the second portion of the balloon is facing the sun. Alternately, or additionally the first portion of the envelope may have different reflective, transmissive, and/or emissive properties than the second portion, including in the thermal IR.

In another aspect, a computer-implemented method involves: (a) causing a balloon to operate using a first mode, wherein the balloon comprises an envelope and a payload positioned beneath the envelope, wherein the envelope comprises a first portion and a second portion, wherein the first portion allows more solar energy to be transferred to the gas within the envelope than the second portion, and wherein operation using the first mode comprises causing altitudinal movement of the balloon via rotation of the envelope to change an amount of the first portion that faces the sun and an amount of the second portion that faces the sun; (b) determining that an ambient light level is below a threshold; and (c) responsively causing the balloon to operate using a second mode, wherein operation in the second mode comprises causing altitudinal movement of the balloon via movement of a lifting gas or air into or out of the envelope.

In another aspect, a non-transitory computer readable medium has stored therein instructions that are executable by a computing device to cause the computing device to perform functions comprising: (a) causing a balloon to operate using a first mode, wherein the balloon comprises an envelope and a payload positioned beneath the envelope, wherein the envelope comprises a first portion and a second portion, wherein the first portion allows more solar energy to be transferred to the gas within the envelope than the second portion, and wherein operation using the first mode comprises causing altitudinal movement of the balloon via rotation of the envelope to change an amount of the first portion that faces the sun and an amount of the second portion that faces the sun; (b) determining that an ambient light level is below a threshold; and (c) responsively causing the balloon to operate using a second mode, wherein operation in the second mode comprises causing altitudinal movement of the balloon via movement of a lifting gas or air into or out of the envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
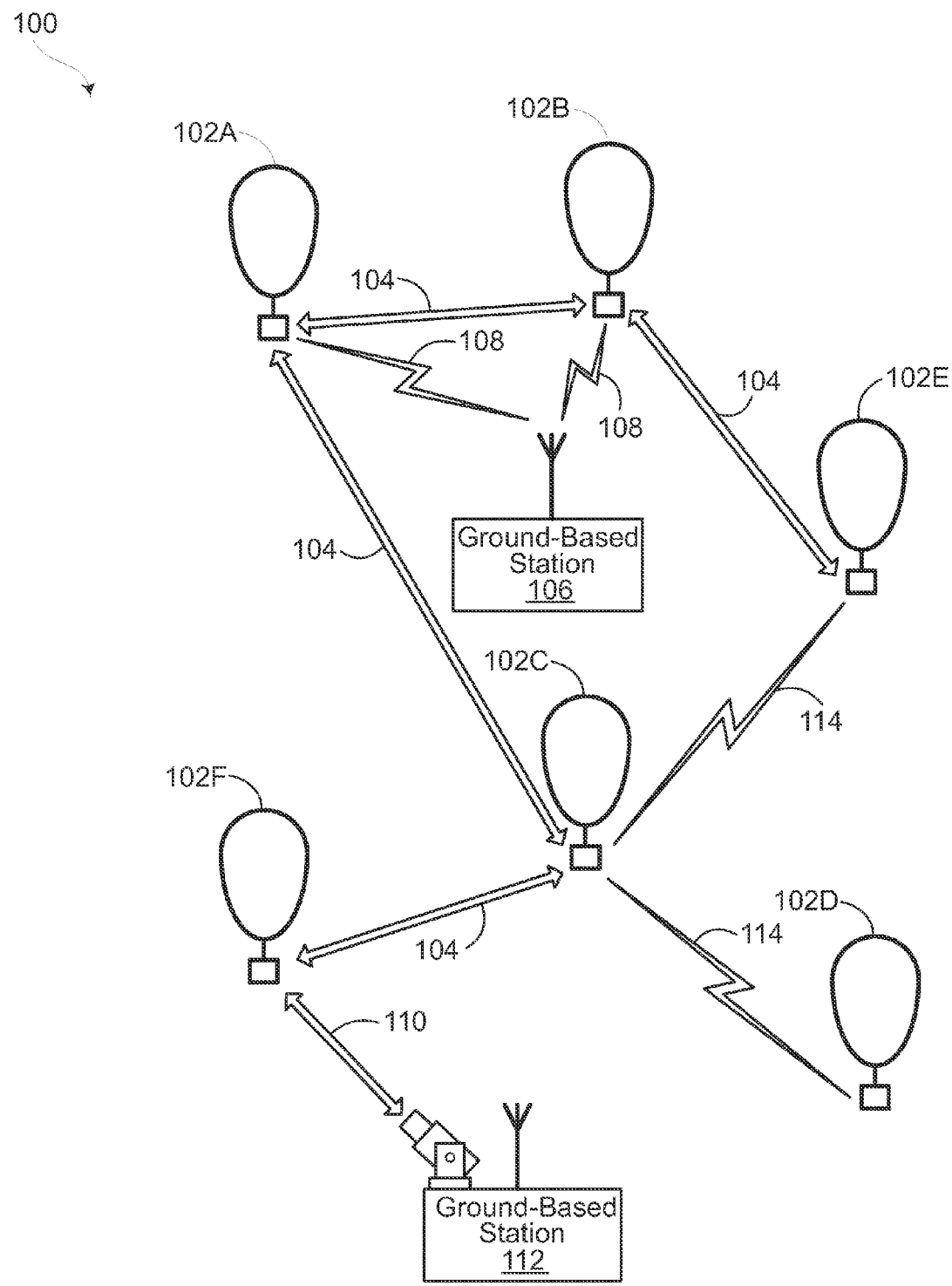
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations In the present disclosed embodiments, the altitude of a balloon may be controlled in a number of different ways. For example, the buoyancy, and thus the altitude, of the balloon may be controlled by adjusting the temperature of the gas within an envelope of the balloon. It should be pointed out that the temperature of the gas within the envelope itself does not change the buoyancy of the balloon. In order for temperature to change buoyancy, the envelope needs to be somewhat elastic so that it expands when heated, or the gas inside is heated, or conversely that it collapses to some degree when cooled, since it is the density change of the gas within the balloon that, by definition, is what changes the buoyancy of the balloon. In any event, under proper circumstances, the altitude of balloon may be controlled by increasing or decreasing the temperature of the gas within the envelope. Thus, during the daylight hours, it may be possible to control the altitude of the balloon by controlling the density of the gas within the balloon, by controlling the amount of solar energy that is absorbed by the gas.

In addition, when the sun goes down, the gas within the envelope of the balloon may cool quickly, and controlling the altitude of the balloon by adjusting the temperature of the gas within the envelope may not be possible. Therefore, at night, it may be desirable to pump more or less gas into the envelope of the balloon, or into a bladder within the envelope of the balloon, to increase or decrease the buoyancy of the balloon. Therefore, it may be useful to provide altitude control for a balloon during the day using a first mode of operation by controlling the density of the gas within the envelope of the balloon through the control of the temperature of the gas within the envelope of the balloon, and it be also be useful to control the altitude of the balloon at night using a second mode of operation by adjusting the volume of the gas within the balloon envelope or bladder to adjust the buoyancy of the balloon as appropriate. At certain times it may be desirable to use both gas density (through controlling gas temperature) and gas volume (by pumping gas into or out of the balloon envelope or bladder) to control the altitude of the balloon. Therefore, it may be desirable to provide altitude control using either the first mode of operation or the second mode of operation, or using the first mode and second mode of operation at the same time.

During the daytime, when the sun is present, the temperature of the gas within the envelope may be controlled by controlling the amount of solar energy that is absorbed by the gas within the balloon envelope. To control the amount of solar energy that is absorbed by the gas within the balloon envelope, the absorptive/reflective properties of the surface of the balloon envelope may be adjusted, or varied, by providing a balloon with an envelope having a first portion of the envelope having a property different from a second portion of the envelope, with respect to reflecting or absorbing solar energy.

In an example embodiment, a first portion of the envelope may be colored white, or some other light color, which reflects more solar energy than a dark colored surface to help prevent the temperature of the gas within the envelope from rising. A second portion of the envelope could be colored black, or some other dark color, which absorbs more solar energy than a lightly colored surface to allow more solar energy to be absorbed by the gas within the envelope, causing the temperature of the gas within the envelope to rise. It may also be the case that a clear side would allow the sun to penetrate into the balloon, warming the air inside. In this way a clear surface would be equivalent to the dark colored or black surface for the portion of the envelope that is presented towards the sun when it desired to warm up the air inside the balloon (relative to the light colored or otherwise reflective side).

Alternately, or in addition to varying the absorptive or reflective properties of the portions of the balloon envelope to control the amount of solar energy entering the balloon envelope, it is also possible to provide a non-symmetrically shaped balloon such that a first portion of the balloon may be oriented towards the sun that allows for more solar energy to be absorbed by the gas within the envelope than when a second portion of the balloon is oriented towards the sun. Therefore, by choosing which side of the non-symmetrically shaped balloon envelope to orient towards the sun, differential heat may be brought into the balloon. By rotating or turning the balloon relative to the sun (which works to the extent the sun is not directly overhead), substantial heating or cooling may be caused by presenting more or less of the surface of the envelope to the sun independent of the one or more materials used on the portions on the outside of the balloon. Of course, a non-symmetrically shaped balloon may be used with a balloon having the same material used for its entire envelope surface area, or may be used in conjunction with a first portion of the balloon having different reflective, transmissive, or emissive properties than a second portion of the balloon.

Thus, the balloon envelope may be engineered to serve as an orientable solar thermal energy collection system. When it is desired to obtain or collect more solar thermal energy the portion of the balloon that allows for the most transmission or absorption of solar energy may be rotated and oriented towards the sun. It should also be noted that the materials chosen to make this envelope might look very different in the thermal IR vs. the visible band. Thus, it may be useful to characterize or describe the material used for the first portion of the balloon and the second portion of the balloon in terms of their reflectivity, transmissivity, and emissivity properties in the two bands (thermal IR and visible band), as well as for each side, since the properties may be quite different. For example, envelope material that looks white to human eyes might in fact be quite black (low R (reflectivity), high E (emissivity), low T (transmissivity) when viewed in the thermal IR. Likewise, a material that appears very reflective on both sides (high R) when viewed in the visible band may have very different properties on one side vs. the other when viewed in the thermal IR band, e.g. metalized Mylar which looks like R=0.95 E=0.05/Rir=0.9 Eir=0.1 on the metalized side and R=0.9 E=0.1/Rir=0.5 Eir=0.5 on the polymer side.

By controlling which portion of the balloon envelope is facing the sun, the temperature of the gas within the balloon envelope may be controlled. In an example embodiment, the balloon may be equipped with the ability to rotate the balloon envelope so that the first portion of the envelope or the second portion of the envelope is positioned facing the sun. Where it is desired to increase the altitude of balloon, the first portion of the balloon envelope that allows for more solar energy to be absorbed by the gas within the envelope may be positioned facing the sun to increase the temperature of the gas within envelope (and increase the altitude of the balloon). Similarly, where it is desired to decrease the altitude of balloon, the second portion of the envelope that allows for less solar energy to be absorbed by the gas within the balloon envelope may be positioned facing the sun to decrease the temperature of the gas within the balloon envelope (and decrease the altitude of the balloon). Relying on solar heat to raise and lower the balloon may not be the most reliable way to accomplish the goal of station keeping of the balloon. However, the use of solar energy has the advantage that it is very energy efficient and doesn't take much energy. Specifically, it takes less energy to turn the balloon into a desired position relative to the sun (using many of the possible ways of turning the balloon) than to change altitude by some other means such as by running an electric air compressor. Thus, the use of solar energy to control balloon altitude may advantageously use less energy than other methods of controlling balloon altitude.

At night time, when the sun is down, it may no longer be possible to use direct solar energy rotation of the balloon envelope to control the altitude of the balloon. Therefore, alternate means for controlling altitude should be available during the night. A second mode of operation that may be used to control the altitude of the balloon may be by introducing additional lifting gas into the balloon envelope or bladder. In this manner, gas may be pumped into or out of the balloon envelope or bladder to control the altitude of the balloon at night. Altimeters or other devices may be used determine the altitude and/or rate of descent and provide for switching from a first mode of altitude control using solar energy, to a second mode of altitude control using inflation/deflation of the balloon envelope or bladder with gas, or some combination thereof.

Furthermore, the payload may include one or more solar cells to store energy that can be used for altitude control during the night. For example, solar energy stored during the day may be used to control the altitude of the balloon by pumping gas into, or out of, the envelope of the balloon, or the bladder of the balloon. Of course, the stored solar energy could also be used to store energy used for rotating the balloon envelope during the day time.

As another example, the solar energy stored during the day may be used to heat the gas within the balloon envelope to provide increased buoyancy. Where hydrogen is used as the lifting gas, it may be possible to use the cooperative operation of a solar array and a fuel cell. Operation of the fuel cell generates ballast (water, a byproduct of the fuel cell reaction) whose mass can be controlled by controlling the operation of the fuel cell. Fuel for the fuel cell can be generated by oxidizing hydrogen, supported by energy from the solar cells. Hydrogen gas may be burned at night to heat the payload and/or the gas within the balloon envelope and/or bladder.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
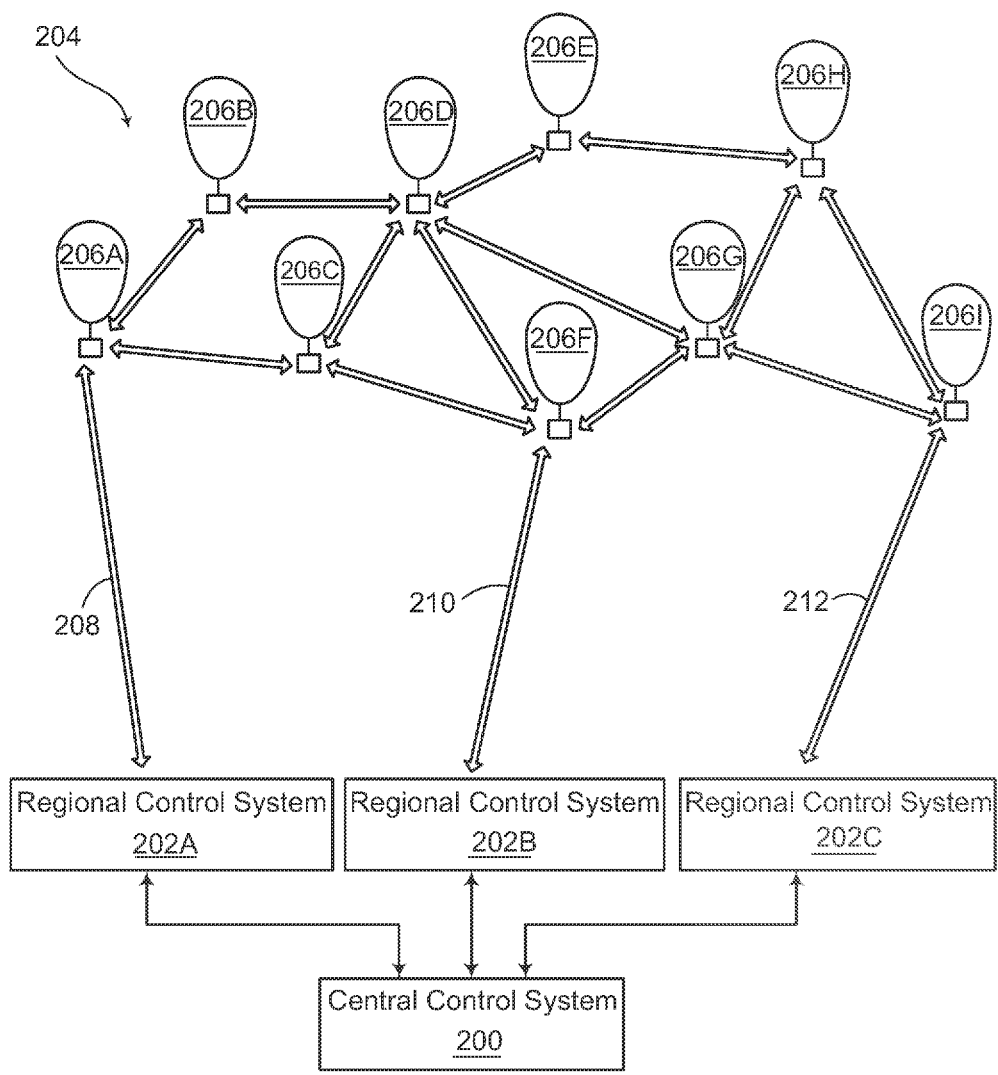
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
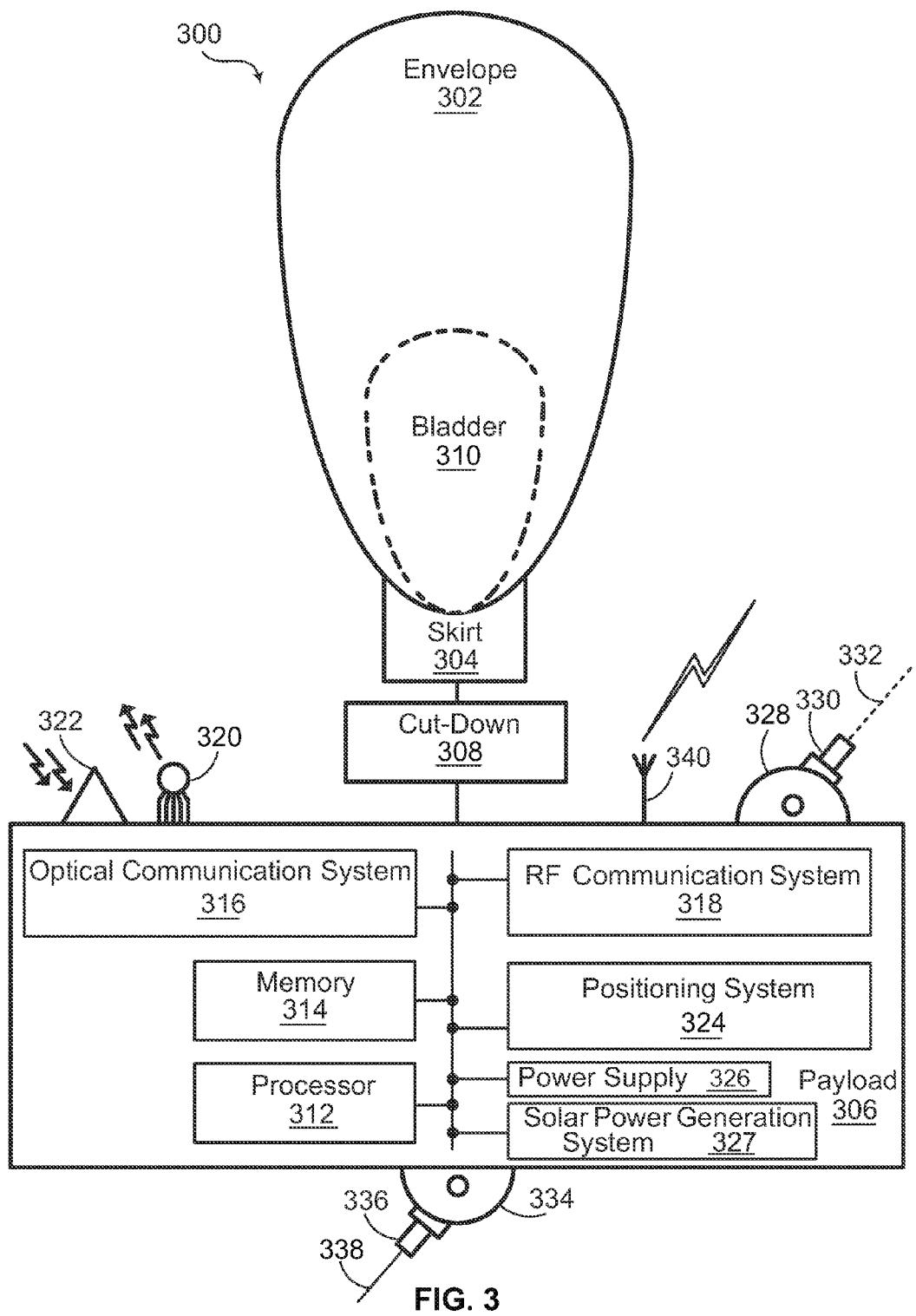
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 4:
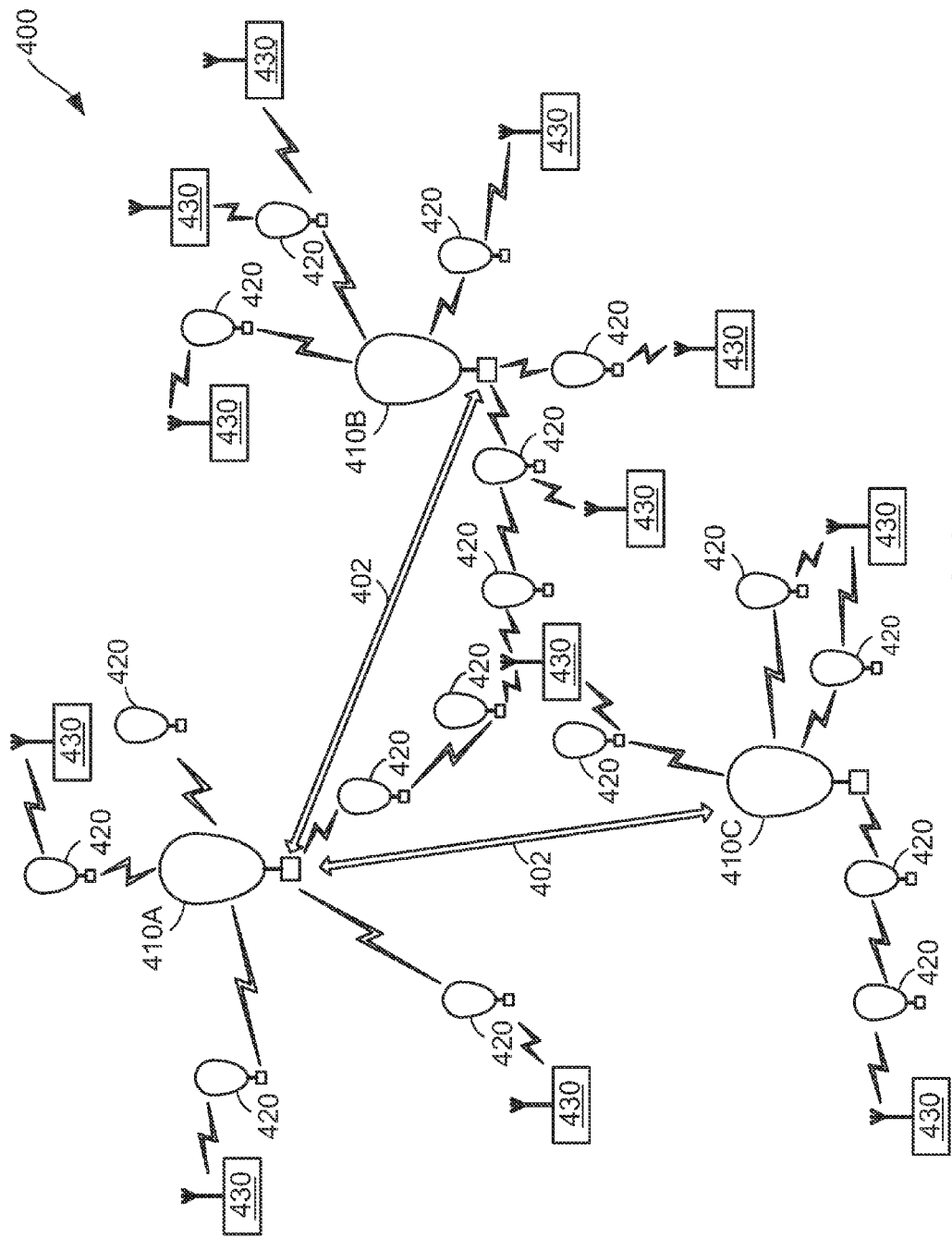
FIG. 4 shows a balloon network that includes super-nodes and sub-nodes, according to an example embodiment.

FIG. 4 is a simplified block diagram illustrating a balloon network that includes super-nodes and sub-nodes, according to an example embodiment. More specifically, FIG. 4 illustrates a portion of a balloon network 400 that includes super-node balloons 410A to 410C (which may also be referred to as "super-nodes") and sub-node balloons 420 (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420 may include a radio-frequency (RF) communication system that is operable for packet-data communication over one or more RF air interfaces. Accordingly, each super-node balloon 410A to 410C may include an RF communication system that is operable to route packet data to one or more nearby sub-node balloons 420. When a sub-node 420 receives packet data from a super-node 410, the sub-node 420 may use its RF communication system to route the packet data to a ground-based station 430 via an RF air interface.

As noted above, the super-nodes 410A to 410C may be configured for both longer-range optical communication with other super-nodes and shorter-range RF communications with nearby sub-nodes 420. For example, super-nodes 410A to 410C may use using high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 GBit/sec or more.

A larger number of high-altitude balloons may then be configured as sub-nodes, which may communicate with ground-based Internet nodes at data rates on the order of approximately 10 Mbit/sec. For instance, in the illustrated implementation, the sub-nodes 420 may be configured to connect the super-nodes 410 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 410A to 410C may function as a core network, while the sub-nodes 420 function as one or more access networks to the core network. In such an embodiment, some or all of the sub-nodes 420 may also function as gateways to the balloon network 400. Additionally or alternatively, some or all of ground-based stations 430 may function as gateways to the balloon network 400.

4. Controlling the Altitude of a Balloon Using a First Mode of Operation by Having an Envelope with a First Portion and a Second Portion, where the First Portion Allows More Solar Energy to be Transferred to Gas within the Envelope and Rotatable to Position a Desired Portion of the Envelope in a Direction Facing the Sun During the Day.

Figure 5A:
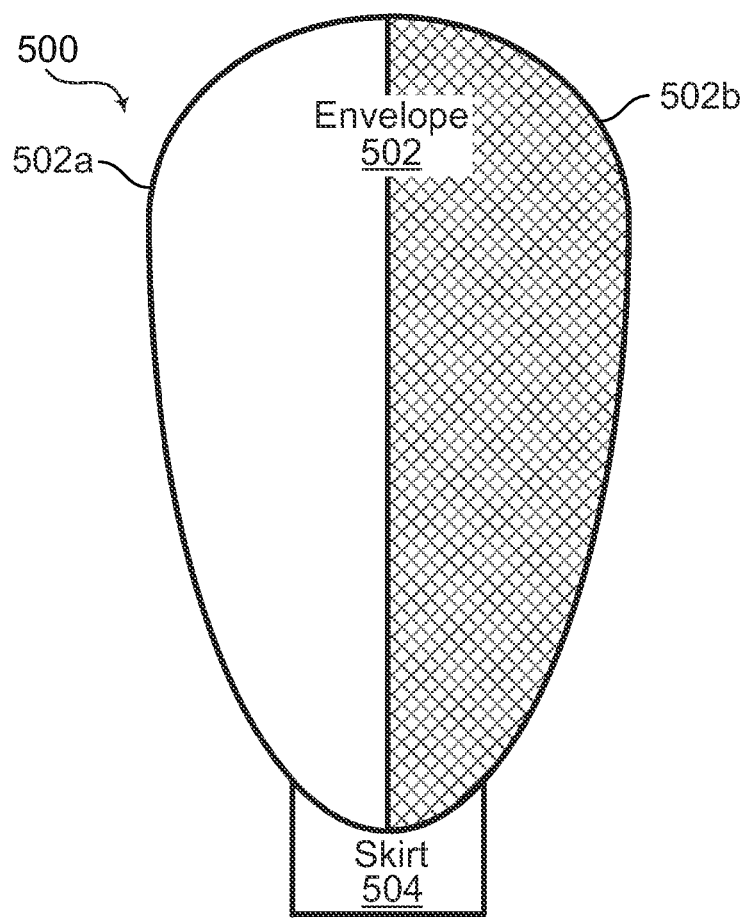
FIG. 5A shows a balloon, according to an example embodiment.
Figure 5B:
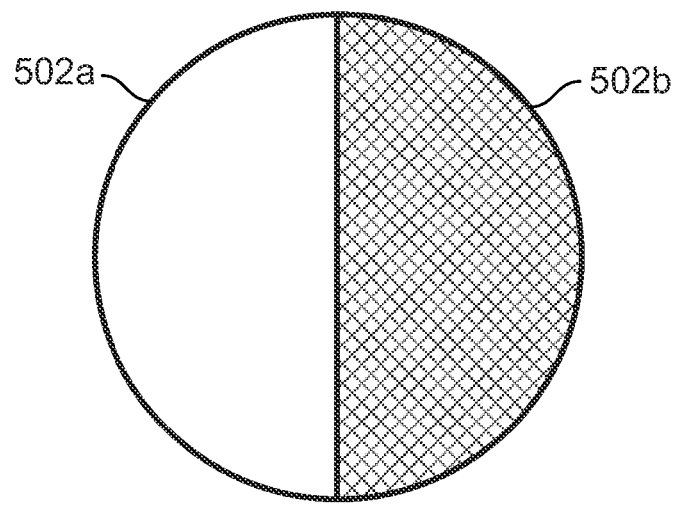
FIG. 5B shows a top view of the balloon shown in FIG. 5A.

In an embodiment, as shown in FIG. 5A, a balloon 500 is shown, with FIG. 5B showing a view of balloon 500 from above. The buoyancy of the balloon 500 (and thus the altitude of the balloon) may be controlled by adjusting the temperature of the gas within envelope 502. As the temperature of the gas within envelope 502 increases, the relative density of the gas within the envelope 502 decreases and the volume of the gas increases, which may result in a more buoyant (or upward) force on the balloon 500, which may cause the altitude of the balloon to increase. Similarly, as the temperature of the gas within envelope 502 decreases, the relative density of the gas within envelope 502 increases and the volume of the gas decreases, which may result in a less buoyant (or upward) force on the balloon 500, which may cause the altitude of the balloon to decrease. Thus, the altitude of balloon 500 may be controlled by increasing or decreasing the temperature of the gas within the envelope 502.

During the day, the temperature of the gas within the envelope of the balloon may be controlled using a first mode of operation by controlling the amount of solar energy that is absorbed by the gas within the envelope. In particular, white surfaces, or lightly colored surfaces, absorb less solar energy than black surfaces, or darkly colored surfaces. Thus, the amount of solar energy absorbed by the gas within envelope 502, and thus the temperature of the gas, may be controlled if the absorptive/reflective properties of the surface of the envelope 502 that is facing the sun are adjustable. Accordingly, the absorptive/reflective properties of the surface of the envelope 502 may be adjusted, or varied, by rotating an envelope 502 having a first portion 502a that allows for less transfer of solar energy to gas within the envelope (e.g., via decreased absorption and/or increased reflection of sunlight), than a second portion 502b of the envelope.

For example, a first portion of the envelope 502a could be colored white, or some other light color, which reflects more solar energy than a dark colored surface to help prevent the temperature of the gas within the envelope 502 from rising. A second portion of the envelope 502b could be colored black, or some other dark color, which absorbs more solar energy than a lightly colored surface to allow more solar energy to be absorbed by the gas within the envelope 502, causing the temperature of the gas within the envelope 502 to rise.

Alternatively, but operating on similar principles, the first portion of the envelope 502a could be opaque or reflective, thereby preventing sunlight from passing into the envelope 502, to help prevent the temperature of the gas within envelope 502 from rising. The second portion of the envelope 502b could be translucent, or transmissive, allowing sunlight to pass through the second portion of envelope 502b and thereby more solar energy to be absorbed by the gas within the envelope 502, to cause the temperature of the gas within the envelope 502 to rise.

Furthermore, alternately, or in addition to varying the absorptive or reflective properties of the portions of the balloon envelope to control the amount of solar energy entering the balloon envelope, it is also possible to provide a non-symmetrically shaped balloon such that a first portion of the balloon may be oriented towards the sun that allows for more solar energy to be absorbed by the gas within the envelope than when a second portion of the balloon is oriented towards the sun.

Figure 8A:
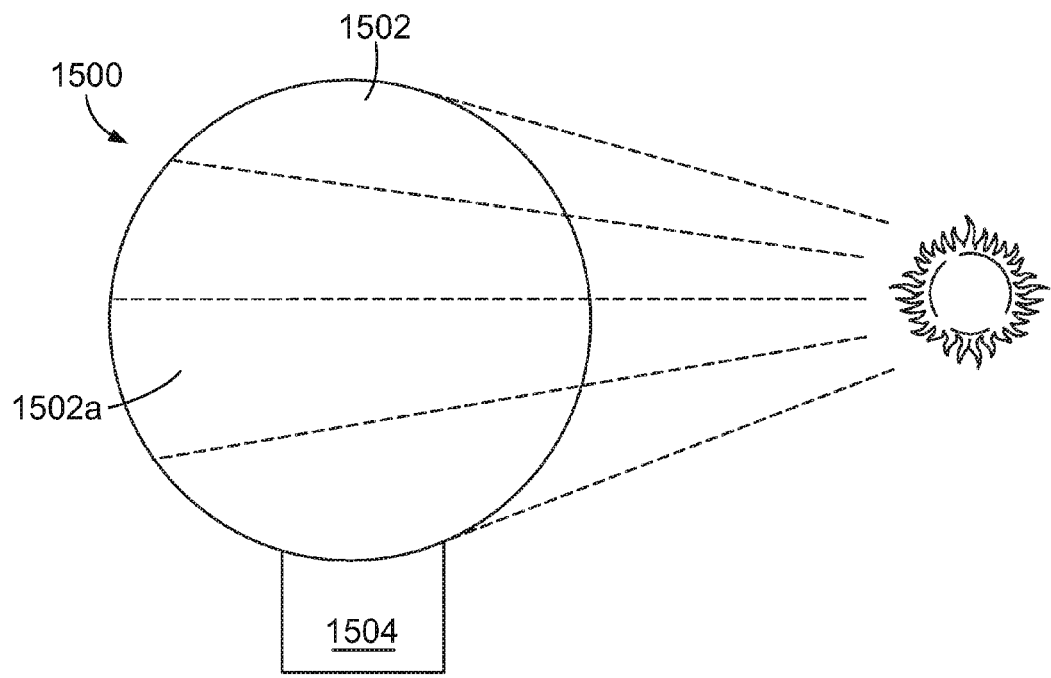
FIG. 8A shows a front view of a balloon, according to an example embodiment
Figure 8B:
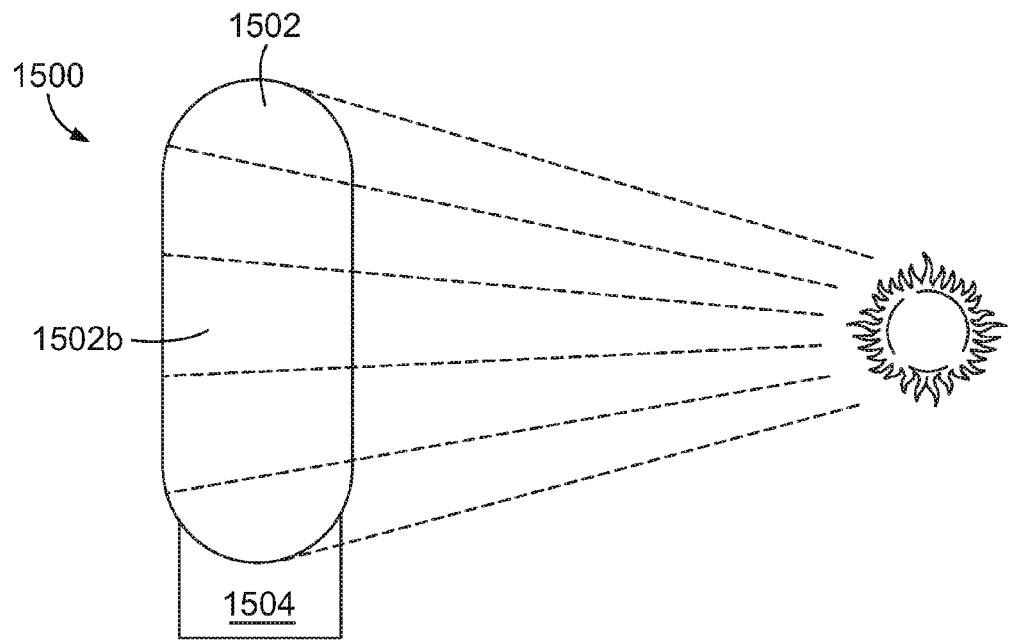
FIG. 8B shows a side view of the balloon shown in FIG. 8A.

For example, in FIG. 8A, balloon 1500 is shown having an envelope 1502 having a first portion 1502a that has a large circular surface area that allows for more solar energy to be absorbed by the gas within the envelope 1502 than second portion 1502b of envelope 1502 shown in FIG. 8B. FIG. 8B shows balloon envelope 1502 after it has been rotated 90 degrees from the position shown in FIG. 8A. By choosing which portion (1502a or 1502b) of the non-symmetrically shaped balloon envelope to orient towards the sun, differential heat may be brought into the balloon. By rotating or turning the balloon 1500 relative to the sun, substantial heating or cooling may be caused by presenting more or less of the surface of the envelope to the sun, without regard to what materials is used for the first portion 1502a or second portion 1502b. Of course, a non-symmetrically shaped balloon may be used with a balloon having the same material used for its entire envelope surface area, or may be used in conjunction with a first portion of the balloon having different reflective, transmissive, or emissive properties than a second portion of the balloon.

Referring back to FIGS. 5A and 5B, by controlling whether portion 502a or 502b of the envelope 502 is facing the sun, the temperature of the gas within the envelope 502 of balloon 500 may be controlled. As discussed in more detail below, balloon 500 may be equipped with the ability to rotate the envelope 502 so that the first portion of the envelope 502a or the second portion of the envelope 502b is positioned facing the sun. Where it is desired to increase the altitude of balloon 500, the first portion of the envelope 502a that allows for more solar energy to be absorbed by the gas within the envelope 502 may be positioned facing the sun to increase the temperature of the gas within envelope 502 (and increase the altitude of the balloon 500). Similarly, where it is desired to decrease the altitude of balloon 500, the second portion of the envelope 502b that allows for less solar energy to be absorbed by the gas within the envelope 502 may be positioned facing the sun to decrease the temperature of the gas within the envelope 502 (and decrease the altitude of the balloon 500).

Similarly, referring back to FIGS. 8A and 8B, by controlling whether portion 1502a or 1502b of the envelope 1502 is facing the sun, the temperature of the gas within the envelope 1502 of balloon 1500 may be controlled. Balloon 1500 may be equipped with the ability to rotate the envelope 1502 so that the first portion of the envelope 1502a or the second portion of the envelope 1502b is positioned facing the sun. Where it is desired to increase the altitude of balloon 1500, the first portion of the envelope 1502a that allows for more solar energy to be absorbed by the gas within the envelope 1502 may be positioned facing the sun to increase the temperature of the gas within envelope 1502 (and increase the altitude of the balloon 1500). Similarly, where it is desired to decrease the altitude of balloon 1500, the second portion of the envelope 1502b that allows for less solar energy to be absorbed by the gas within the envelope 1502 may be positioned facing the sun to decrease the temperature of the gas within the envelope 1502 (and decrease the altitude of the balloon 1500).

It will be appreciated that it may be desirable to have a certain amount of the first or second (or even third or more portions) of the envelope facing the sun. Thus, for example, it may be preferred to have 100% of the first portion of the envelope facing the sun, and 0% of the second portion of the envelope facing the sun, or vice versa. Alternately, it may be desired to have a preferred ratio of 30% of the first portion of the envelope and 70% of the second portion of the envelope facing the sun.

Figure 6A:
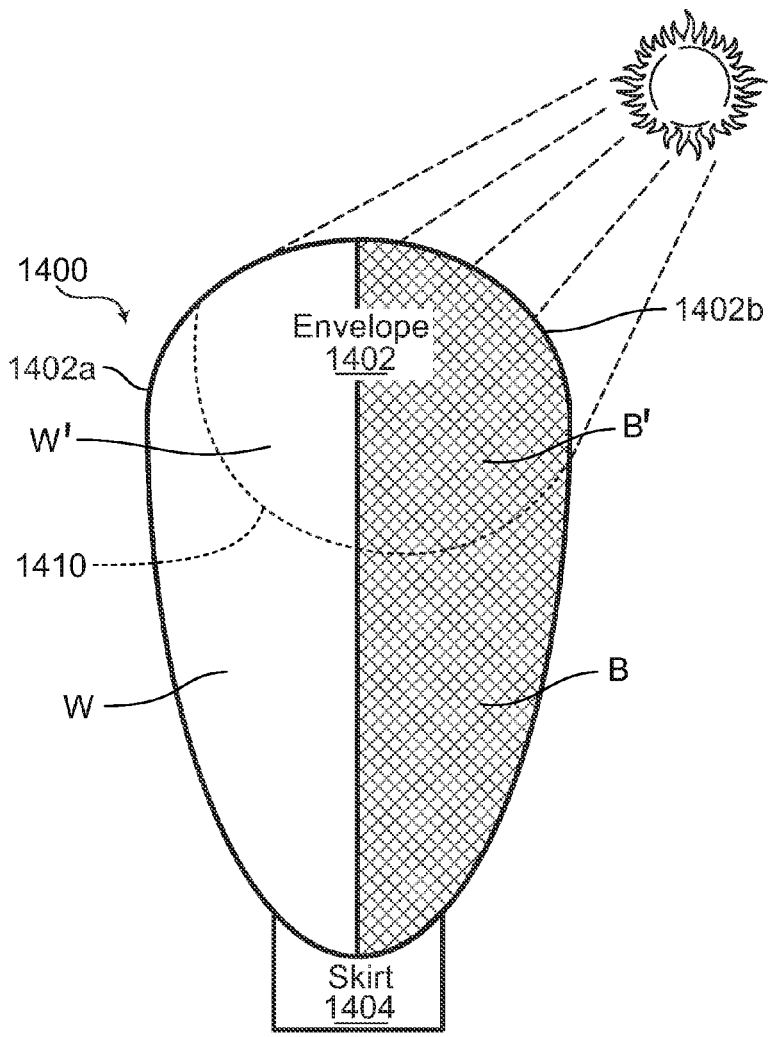
FIGS. 6A and 6B shows the balloon of FIGS. 5A and 5B with certain portions of the balloon envelope exposed to the sun.
Figure 6B:
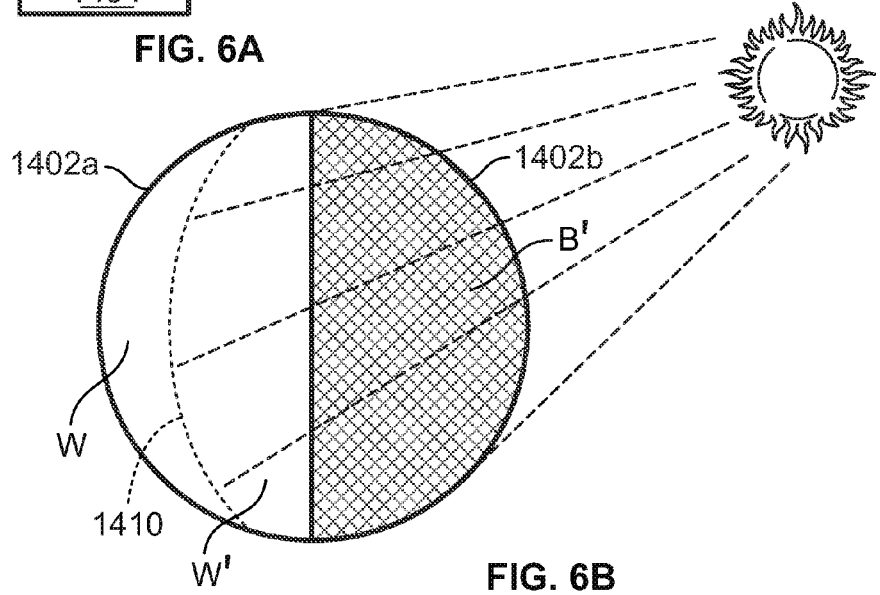

FIGS. 5A and 5B show a simplified scenario making the assumption that half of the balloon surface is exposed to the sun. However, as shown in FIGS. 6A and 6B, in balloon 1400, envelope portion 1402a allows more solar energy to be absorbed by the gas within the envelope 1402 than envelope portion 1402b. Envelope portion 1402a covers an area W, and in certain times of the day, e.g., when the sun is directly overhead, only a portion W' of area W is directly exposed to sunlight. Similarly, envelope portion 1402b allows less solar energy to be absorbed by the gas within the envelope 1402 than envelope portion 1402a. Envelope portion 1402 covers an area B, and at certain times of the day, only a portion B' of area B is directly exposed to sunlight.

Assuming area W has an energy transmission factor WT and area B has an energy transmission factor BT, and the surface area of the sun-exposed area of W is W' and the surface area of the sun-exposed area B is B', the total energy to be absorbed by the gas within the balloon envelope may be governed by the equations EnergyTotal=(W'×WT)+(B'×BT). Thus, the amount of energy transferred to the gas within the envelope 1402 may be viewed as a function of area W' and B' that is directly exposed to the sun. By rotating the balloon envelope 1402 so that the area of W' is increased (and therefore the area B' is decreased), the amount of solar energy transferred to the gas within envelope 1402 may be increased. Conversely, if it is desired to decrease the amount of energy absorbed the gas within the envelope 1402, then the balloon envelope 1402 may be rotated so that the area W' is decreased (and therefore the area B' is increased).

The above equation for EnergyTotal may also be simplified in that it assumes that the energy transmission factors WT is constant across sun-exposed area W' and that energy transmission factor BT is also constant across sun-exposed area B'. However, the energy transmission factors WT and BT might vary across the surface of the envelope based on the angle of incidence at which the sunlight hits the envelope at a given point. In addition, the amount of solar energy transferred to gas in the envelope may be a function of the shape and size of the surface area that faces the sun, the size and shape of B' and W', the position and/or location of the sun relative to the envelope, the intensity of sunlight (which may be a function of the time of day, the month, the year), and/or the absorptive, reflective, and/or refractive properties of the materials with which B and W are constructed.

Nonetheless, the amount of solar energy absorbed or reflected by the balloon envelope may be controlled and/or adjusted by controlling and/or adjusting the amount of the portions of the balloon envelope that are facing the sun. In this manner, the energy absorption of the gas or air within the balloon may be controlled in a continuous fashion by altering the ratios of the portions of the balloon envelope facing the sun.

FIGS. 5 and 5A show sharp dividing lines between the different portions of the envelope. However, it will appreciated that the division between the first and section portions of the envelope could be gradual, allowing for a continuously decreasing amount of solar energy absorbed by the gas within the envelope as the darker or more transmissive portion of the envelope is rotated away from a position facing the sun to a position where the lighter or more opaque or reflective portion of the envelope is positioned facing the sun. Thus, with a gradual change between the first and second portions of the envelope, as the envelope is slowly rotated, the amount of solar energy that may be absorbed by the gas within the envelope may be slowly reduced. The portions of the balloon envelope could be made of materials that either absorb light or reflect light so as to change the temperature (and therefore the pressure and density of the gas) on the inside of the balloon, as well as materials that change their elasticity and expand and/or contract when they, or the gas within them, or heated and/or cooled.

In addition, the size and the shape of the balloon could be modified to further allow for a more clear distinction between the first and second portions of the envelope. For example, the envelope of the balloon could have a generally rectangular shape with two oppositely disposed major surfaces corresponding to the first and second portions of the envelope.

The balloon 500 shown in FIGS. 5A and 5B, or balloon 1500 shown in FIGS. 8A and 8B may, but is not required to, further include a bladder, like the bladder 310 depicted in FIG. 3. The bladder may be used to act as a type of ballast to further control the altitude of the balloon 500 or 1500. As the bladder is filled with more air, the density of the gas within the envelope increases resulting in a decrease in the buoyant, upward force of the balloon, which also results in a decrease in the altitude of the balloon. Similarly, to increase the buoyant, upward force of the balloon and increase the altitude of the balloon, the air may be removed, or bled, from the bladder, resulting in a lower density of the gas in the envelope and a higher buoyant, upward force of the balloon, which results in an increase in the altitude of the balloon.

In addition, there are also alternative ways of using the natural environment and/or natural temperature changes to control the temperature of the gas and/or air within the balloon (in the balloon envelope or bladder) to control or change the altitude of the balloon. For example, one could make the balloon fairly thermally insulated, e.g., with a low emissivity, and then include a heat sink (which could take the form of a metal fin, or a fin made of a thermally conductive material such as Beryllium Copper) that is extendable and/or retractable from the balloon such that the fin could be positioned below the balloon and thermally coupled to the gas within the balloon (via a rod, for example). In this manner, when it is desired to cool the gas within the balloon (in the bladder or envelope) more quickly, the heat sink could be deployed and the metal fin extended into the atmosphere where heat from within the balloon may be transferred to the atmosphere. Similarly, when it desired to cool the air or gas within the balloon more slowly, the heat sink or fin could be retracted so that less heat is transferred from the gas or air within the balloon to the atmosphere. Thus, the heat sink or fin may be extended when it is desired to cool the air or gas within the balloon more quickly, and the heat sink or fin may be retracted when it is desired to cool the air or gas within the balloon more slowly.

The rotation of the envelope may be accomplished by using an offset fan or fans positioned on and extending from one of the components of the balloon 500. The further the fan is placed from the center of mass of the balloon, the greater the rotational force for rotating the envelope of the balloon. The fan or fans may be attached to a retractable arm or support when not needed for operation.

In addition, a directional spigot of compressed air, or compressed air directed towards a thrust plate or thrust deflector (retractable and/or adjustable if desired) positioned on and extending from a component of the balloon 500 could also be used to achieve the desired rotation of the envelope. The further the directional spigot or compressed air is placed from the center of mass of the balloon, the greater the rotational force for rotating the envelope of the balloon. A fin or wing that is manoeuvrable may be used to rotate, or control the rotation, of the balloon.

In some applications, it may be desirable to have the envelope 502 of the balloon 500 rotatable about the payload, the cut-down, or the skirt. For example, the envelope 502 may be rotatably connected using a gimbal support, or spherical roller bearing, thereby allowing three degrees of freedom, i.e., roll, pitch, and yaw at the point of connection. In addition, the rotatable connection could be made using any of a variety of bearings, including a plain bearing, a friction bearing, or roller bearing, or even an air bearing.

The rotation of the envelope 502 may be controlled by a motor, or servomotor. The rotation of the envelope 500 may be further controlled by an indexing mechanism. Such an indexing mechanism could include a ratchet and pawl indexing mechanism that allows for a toothed ratchet or gear to rotate freely in one direction, but that is prevented from rotating in the opposite direction by a pawl, where the pawl could be spring loaded. A roller ratchet or notched wheel could also be used for indexing.

With reference to FIG. 3, the envelope of the balloon could be controlled to rotate a desired portion of the envelope towards the sun.

The positioning of the desired portion of the envelope towards the sun could be performed by the balloon that the envelope is attached to, for instance using processor 312 and memory 314 to control rotatable connection of the envelope. Alternatively, the positioning of the desired portion of the balloon could be controlled remotely by another balloon or ground- or space-based station.

Once under local or remote control, positioning of the envelope could be adjusted as the sun moved to point the desired portion of the envelope towards the sun. In other words, adjustments could be performed with an effort to maintain the positioning of the desired portion of the envelope towards the sun. Or the positioning of the desired portion of the envelope could be continuously adjusted to account for the continual movement of the sun.

In any event, during times when the sun is out, it may be possible to control, at least in part, the altitude of the balloon by rotating the balloon so that desired portions of the envelope are facing the sun, thereby controlling of the amount of solar energy that is absorbed by the gas within the envelope of the balloon. Using solar energy to control the altitude of the balloon may be advantageous because less energy may be consumed rotating the balloon into proper position relative to the sun, than using other methods of altitude control including inflating/deflating the balloon envelope or bladder, or burning hydrogen to heat the gas within the balloon.

5. Using a Second Mode of Operation for Altitude Control

At night time, when the sun is down, it may no longer be possible to use direct solar energy and rotation of the balloon envelope to control the altitude of the balloon. Therefore, a second mode for controlling altitude should be available during the night. A second mode of operation used to control the altitude of the balloon at night is by introducing additional lifting gas into the balloon envelope or bladder. In this manner, gas may be pumped into or out of the balloon envelope or bladder to control the altitude of the balloon at night. Altimeters or other devices may be used determine the altitude and/or rate of descent and provide for switching from a first mode of altitude control using solar energy, to a second mode of altitude control using inflation/deflation of the balloon envelope or bladder with gas, or some combination thereof. Of course, at certain times of the day, it may be desirable to use the first mode of operation for altitude control, the second mode of altitude control, or the first mode and second mode of operation for altitude control at the same time.

Furthermore, in order to harness energy to provide for altitude control at night, the payload may include one or more solar cells to store energy that can be used for altitude control during the night. For example, solar energy stored during the day may be used to control the altitude of the balloon by pumping gas into, or out of, the envelope of the balloon, or the bladder of the balloon.

Figure 7:
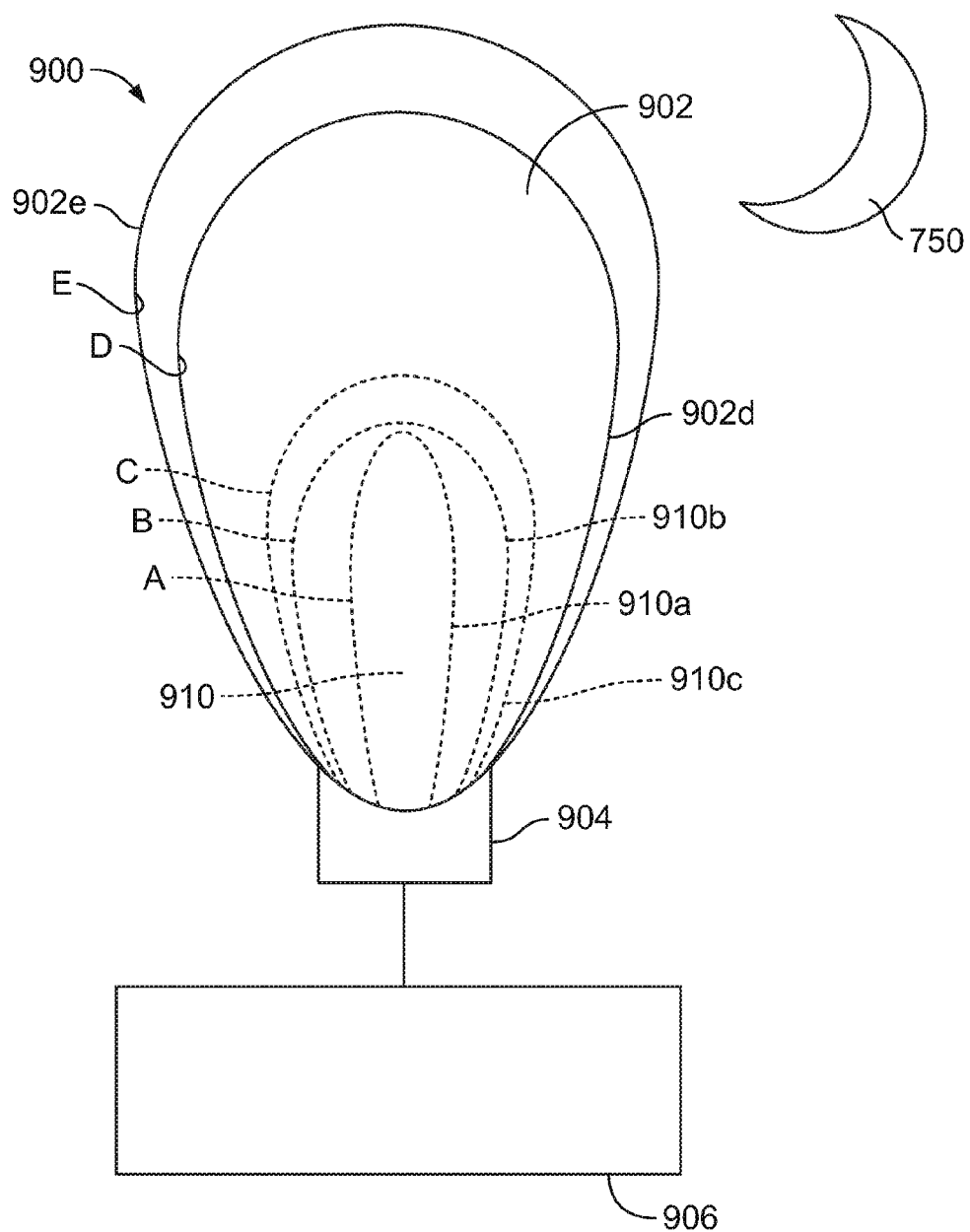
FIG. 7 shows a balloon, according to an example embodiment.

During the second mode of altitude control, the balloon envelope may need to expand to allow the gas to become less dense and to provide a more buoyant upward force. As shown in FIG. 7, during the night for example, the balloon envelope 902 of balloon 900 may expand. For example, the balloon envelope 902 may expand from an envelope size 902D to an envelope size 902E. Similarly, the bladder 910 of balloon 910 may also expand as gas is pumped into the bladder from, as an example, bladder size 910A to bladder size 910B, and even to bladder size 910C.

When the sun comes back up the following morning, it may desirable to switch back to the first mode of controlling the balloon altitude, using rotation of the balloon envelope to properly position the balloon envelope in relation to the sun and to adjust the temperature of the gas within the balloon envelope as desired. It should be clear that the first mode of altitude control and the second mode of altitude control discussed above are not two different mutually exclusive modes. During the day, it may be desirable to use the first mode of altitude control as much as possible, but this may need to be augmented by also using the second mode of altitude control. For example, from 11 am to 1 pm, when the sun is mostly directly above the balloon, the second mode of altitude control may need to be mostly used. Also, even in the day, the heat from the sun used in the first mode of altitude control may not provide as much vertical travel as desired so it may need to be to be augmented even at 3 pm (which is about the best time for this) with the pump used in the second mode of altitude control.

Accordingly, when inflating the balloon envelope for altitude control, it may be desirable to allow the exterior shape of the envelope to expand as the temperature of the gas within the envelope is increased, and to have the exterior shape return to its normal shape when the temperature of the gas within the envelope is decreased. The use of memory metal may be used for the exterior of the balloon envelope to allow the balloon to expand when the temperature of the gas within the envelope is increased, and return to its former exterior shape when the temperature of the gas within the envelope is decreased. Thus, the exterior shape of the envelope may change back and forth from its normal exterior shape to an expanded shape.

Figure 9:
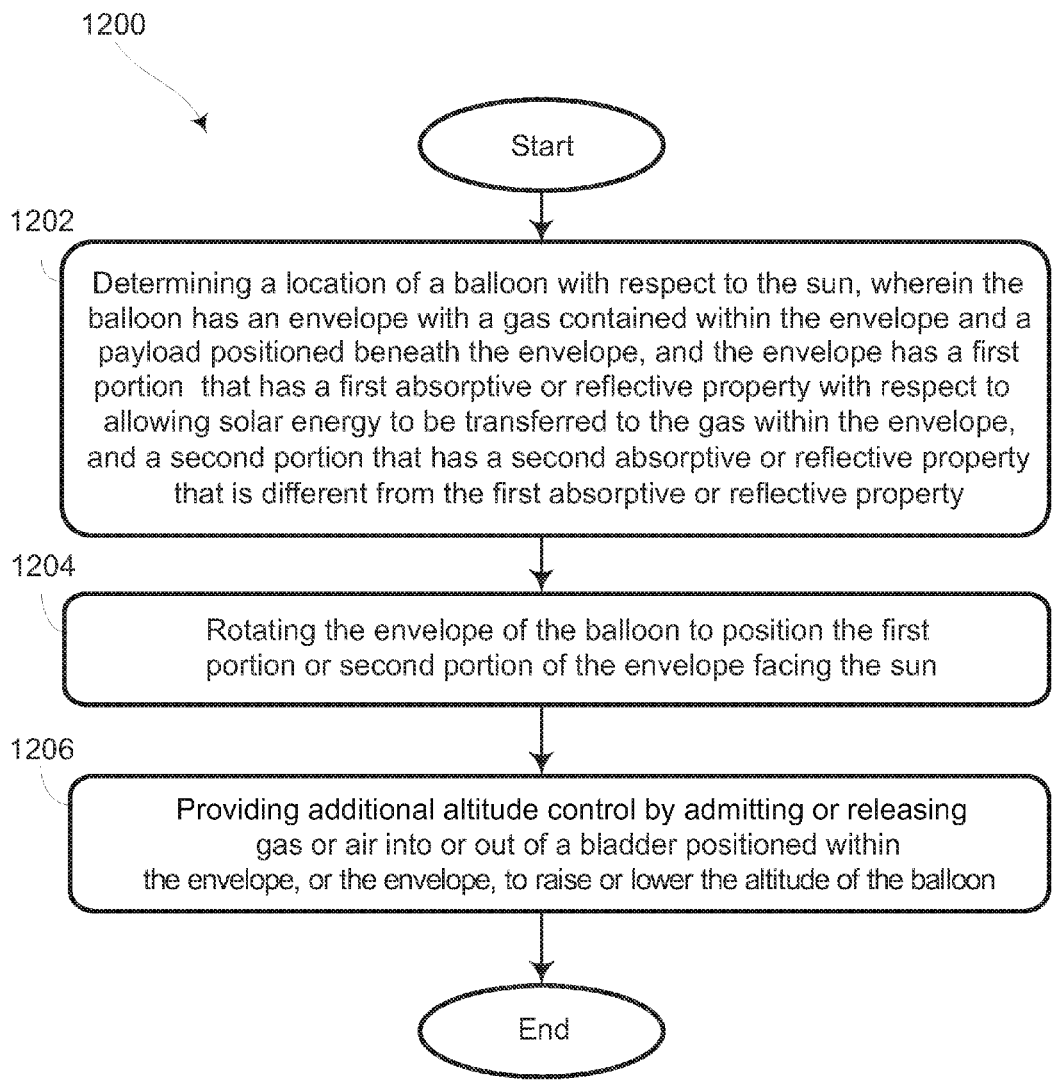
FIG. 9 is a method, according to an example embodiment.

FIG. 9 shows a method 1200 that is provided that includes the step 1202 of determining a location of a balloon with respect to the sun, wherein the balloon has an envelope with a gas contained within the envelope and a payload connected to the envelope, and the envelope has a first portion that has a first absorptive or reflective property with respect to allowing solar energy to be transferred to the gas within the envelope, and a second portion that has a second absorptive or reflective property that is different from the first absorptive or reflective property. The method 1200 further includes the step 1204 of rotating the envelope of the balloon to position the first portion or second portion of the envelope facing the sun. The method 1200 may also provide an additional mode of altitude control by including the step 1206 of admitting or releasing gas or air into a bladder positioned within the envelope to raise or lower the altitude of the balloon, or admitting or releasing gas or air into the balloon envelope to raise or lower the altitude of the balloon. Other techniques known in the art to properly position a desired portion of the envelope towards the sun may be reasonably used within the context of the disclosure.

6. A Non-Transitory Computer Readable Medium with Instructions to Control the Positioning of a Desired Portion of the Envelope Towards the Sun.

Some or all of the functions described above and illustrated in FIGS. 3, 5A, 5B, 6A, 6B, 7, 8A, and 8B may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include the determination of a location of a first balloon, and the positioning of a portion of the envelope of the balloon in relation to the sun. The functions could also include pumping gas or air into or out of the balloon envelope or bladder to control the altitude of the balloon during the night, or other desired times.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A balloon, comprising:
   an envelope;
   a payload positioned beneath the envelope, wherein the envelope comprises a first portion and a second portion, wherein the first portion allows more solar energy to be transferred to gas within the envelope than the second portion; and
   a control system that is configured to cause the balloon to operate using a first mode in which altitudinal movement of the balloon is caused, at least in part, by rotating the envelope to change an amount of the first portion that faces the sun and an amount of the second portion that faces the sun;
   wherein the control system is further configured, responsive to not attaining a desired altitude or rate of descent or ascent, to cause the balloon to operate using a second mode in which altitudinal movement of the balloon is caused, at least in part, by moving a lifting gas or air into or out of the envelope.

2. The balloon of claim 1, wherein altitudinal movement of the balloon while operating in the second mode is caused, at least in part, by moving the lifting gas or air into or out of a bladder within the envelope.

3. The balloon of claim 1, wherein the control system causes the balloon to operate using the first mode and the second mode at the same time.

4. The balloon of claim 1, wherein altitudinal movement of the balloon in the first mode is further caused by moving a lifting gas or air into or out of the envelope.

5. The balloon of claim 1, wherein the lifting gas or air is moved into a bladder within the envelope.

6. The balloon of claim 1, wherein one or more solar cells are positioned within the payload to store energy for altitudinal movement of the balloon when it operates using the first and/or second mode.

7. The balloon of claim 1, wherein the second mode of altitude control is provided where a lifting gas or air is moved into or out of the balloon envelope to control the altitude of the balloon.

8. The balloon of claim 1, wherein the second mode of altitude control is provided where a lifting gas or air is moved into or out of a bladder within the balloon envelope to control the altitude of the balloon.

9. The balloon of claim 1, wherein during the second mode of altitude control, the envelope of the balloon may expand from a first size to a second shape.

10. The balloon of claim 9, wherein the balloon envelope includes memory metal to return the balloon to the first size after it has been expanded.

11. The balloon of claim 1, wherein the envelope is non-symmetrical in shape such that the first portion has a surface area that is greater than a surface area of the second portion.

12. The balloon of claim 11, wherein more solar energy is transferred to gas within the envelope when the first portion of the balloon is facing the sun than when the second portion of the balloon is facing the sun.

13. The balloon of claim 1, wherein the first portion has different reflective, transmissive, and/or emissive properties than the second portion.

14. The balloon of claim 13, wherein the first portion has different reflective, transmissive, and/or emissive properties than the second portion when viewed in the thermal IR.

15. A computer-implemented method, comprising:
    causing a balloon to operate using a first mode, wherein the balloon comprises an envelope and a payload positioned beneath the envelope, wherein the envelope comprises a first portion and a second portion, wherein the first portion allows more solar energy to be transferred to gas within the envelope than the second portion, and wherein operation in the first mode comprises:
        causing altitudinal movement of the balloon via rotation of the envelope to change an amount of the first portion that faces the sun and an amount of the second portion that faces the sun;
    determining that an ambient light level is below a threshold; and
    responsively causing the balloon to operate using a second mode, wherein operation in the second mode comprises:
        causing altitudinal movement of the balloon via movement of a lifting gas or air into or out of the envelope.

16. The method of claim 15, wherein the causing altitudinal movement of the balloon via rotation of the envelope comprises operating one or more fans to rotate the envelope.

17. The method of claim 15, wherein causing altitudinal movement of the balloon via rotation of the envelope comprises causing a directional spigot to release compressed air to rotate the envelope.

18. The method of claim 15, wherein the method includes operating the balloon using the first mode and the second mode at the same time.

19. The method of claim 15, wherein the envelope is non-symmetrical in shape such that the first portion has a surface area that is greater than a surface area of the second portion.

20. The method of claim 19, wherein more solar energy is transferred to gas within the envelope when the first portion of the balloon is facing the sun than when the second portion of the balloon is facing the sun.

21. The balloon of claim 15, wherein the first portion has different reflective, transmissive, and/or emissive properties than the second portion.

22. The balloon of claim 21, wherein the first portion has different reflective, transmissive, and/or emissive properties than the second portion when viewed in the thermal IR.

23. A non-transitory computer readable medium having stored therein instructions executable by a computing device to cause the computing device to perform functions comprising:
- causing a balloon to operate using a first mode, wherein the balloon comprises an envelope and a payload positioned beneath the envelope, wherein the envelope comprises a first portion and a second portion, wherein the first portion allows more solar energy to be transferred to gas within the envelope than the second portion, and wherein operation in the first mode comprises:
- causing altitudinal movement of the balloon via rotation of the envelope to change an amount of the first portion that faces the sun and an amount of the second portion that faces the sun;
- determining that an ambient light level is below a threshold; and
- responsively causing the balloon to operate using a second mode, wherein operation in the second mode comprises:
- causing altitudinal movement of the balloon via movement of a lifting gas or air into or out of the envelope.

24. The non-transitory computer readable medium of claim 23, wherein causing altitudinal movement of the balloon via rotation of the envelope comprises operating one or more fans to rotate the envelope.

25. The non-transitory computer readable medium of claim 23, wherein causing altitudinal movement of the balloon via rotation of the envelope comprises causing a directional spigot to release compressed air to rotate the envelope.

\* \* \* \* \*